(12) United States Patent
Jolivet et al.

(10) Patent No.: US 11,892,374 B2
(45) Date of Patent: Feb. 6, 2024

(54) DEVICE FOR MONITORING THE TIGHTNESS OF SEALING COMPONENTS

(71) Applicant: GAZTRANSPORT ET TECHNIGAZ, Saint Remy les Chevreuse (FR)

(72) Inventors: Pierre Jolivet, Saint Remy les Chevreuse (FR); David Hassler, Saint Remy les Chevreuse (FR); Julien Glory, Saint Remy les Chevreuse (FR)

(73) Assignee: GAZTRANSPORT ET TECHNIGAZ, Saint Remy les Chevreuse (FR)

(*) Notice: Subject to any disclaimer, the term of this patent is extended or adjusted under 35 U.S.C. 154(b) by 198 days.

(21) Appl. No.: 17/602,030

(22) PCT Filed: Apr. 15, 2020

(86) PCT No.: PCT/EP2020/060554
§ 371 (c)(1),
(2) Date: Oct. 7, 2021

(87) PCT Pub. No.: WO2020/212400
PCT Pub. Date: Oct. 22, 2020

(65) Prior Publication Data
US 2022/0146359 A1    May 12, 2022

(30) Foreign Application Priority Data
Apr. 15, 2019 (FR) .................................... 1903980

(51) Int. Cl.
*G01M 3/14* (2006.01)
*G01M 3/22* (2006.01)

(52) U.S. Cl.
CPC .............. *G01M 3/14* (2013.01); *G01M 3/145* (2013.01); *G01M 3/22* (2013.01)

(58) Field of Classification Search
CPC ..... G01M 3/02; G01M 3/04; G01M 3/12–148
See application file for complete search history.

(56) References Cited

U.S. PATENT DOCUMENTS

| 4,002,055 A | 1/1977 | Kops |
| 4,979,390 A * | 12/1990 | Schupack ............... G01M 3/12 73/40 |
| 10,782,203 B2 * | 9/2020 | Pillar ...................... G01M 3/02 |

FOREIGN PATENT DOCUMENTS

| CH | 215694 A | 7/1941 |
| JP | 2000329638 A | 11/2000 |

(Continued)

OTHER PUBLICATIONS

Kim et al., Apparatus for Testing Barrier Leakage of LNG Tank, Mar. 2016, FIT Translation (Year: 2016).*

(Continued)

*Primary Examiner* — Erika J. Villaluna
(74) *Attorney, Agent, or Firm* — Notaro, Michalos & Zaccaria P.C.

(57) ABSTRACT

A device for monitoring the tightness of a sealing component wherein the monitoring device has a box with a peripheral partition and a cover made of a transparent material is disclosed. The cover is connected to the peripheral partition such that the cover and the peripheral partition are able to define, with a sealing component, an inner chamber, the peripheral partition with an inner peripheral wall having a lower end equipped with an inner peripheral seal intended to be positioned against the sealing component all around the inner chamber, and an outer peripheral wall arranged outside the inner peripheral wall so as to define, between the outer peripheral wall and the inner peripheral wall, an intermediate chamber extending exclusively in the peripheral partition all around the inner chamber.

17 Claims, 6 Drawing Sheets

(56) References Cited

FOREIGN PATENT DOCUMENTS

| | | | |
|---|---|---|---|
| JP | 2017227530 | A | 12/2017 |
| KR | 20160035430 | A | 3/2016 |
| KR | 101644126 | B1 | 7/2016 |

OTHER PUBLICATIONS

International Search Report for corresponding PCT application No. PCT/EP2020/060554, dated Jul. 14, 2020.

\* cited by examiner

DEVICE FOR MONITORING THE TIGHTNESS OF SEALING COMPONENTS

TECHNICAL FIELD

The invention relates to the field of the devices for checking the tightness of sealing components, such as a single-layer or multilayer membrane (for example a triplex-type composite) for a fluid storage tank, such as a liquified gas. In particular, these tanks can be sealed and thermally insulating tanks, with membranes for storing and/or transporting liquified gas at low temperatures, such as tanks for transporting liquified petroleum gas (also called LPG) for example having a temperature of between −50° C. and 0° C., or for transporting liquified natural gas (LNG) having a temperature of approximately −162° C. at atmospheric pressure. These tanks can be installed onshore, in/under water of GBS (Gravity-Based Structure) type or on a floating structure. In the case of a floating structure, the tank can be intended to transport liquified gas or to receive liquified gas serving as fuel for the propulsion of the floating structure.

PRIOR ART

Technological Background

In order to perform a tightness test on a sealing membrane of a fluid storage tank, it is known practice from the prior art to use a tightness checking device comprising a so-called vacuum box which comprises an inner chamber in which a depression is produced in order to locally check the tightness. Such a vacuum box comprises a transparent cover and a peripheral partition having a peripheral seal which is intended to be pressed against the sealing membrane to be tested in order to tightly close the inner chamber.

To perform the sealing test with such a checking device, water including surface active agents such as soap is applied to the portion of membrane to be tested. Then, the checking device is placed on the portion to be tested and the inner chamber is depressurized, the size of the portion to be tested thus corresponding to the size of the inner chamber. Thus, in case of a membrane leak, it is possible to observe, through the transparent cover, in the area of the leak, the formation of bubbles.

In order to perform a tightness check on the entire membrane, it is therefore necessary to repeat this operation a large number of times in the flat zones and in the corner zones of the tank, and notably at the joins between two strips of the sealing membrane where they are glued to one another. As an example, for an LNG or LPG tank of conventional dimensions, checking the tightness of a membrane at least partially covering the different faces of the tank entails several thousands of tightness tests, generally of the order of 3000 to 5000 tests to cover all the zones to be checked. These successive operations are difficult to implement, require a number of operators and take a long time to perform all of the tightness check.

Furthermore, the systems of the prior art have the drawback of having an unsatisfactory tightness at the peripheral seal which makes the tightness test inconclusive. In fact, stray bubbles tend to form over the entire perimeter of the seal. It thus becomes difficult to detect whether the appearance of the bubbles is due to a leakage problem in the membrane or to a poor seal of the vacuum box.

The document KR101644126 discloses a tightness checking device comprising an inner box forming the inner chamber and an outer box entirely covering the inner box and forming an intermediate chamber all around the inner box. In this device, the inner box and the outer box each comprise a peripheral seal. Furthermore, each chamber of the device is connected to an independent depressurizing member such that the intermediate chamber is subjected to a lesser depressurization than the inner chamber.

This type of system, while it makes it possible to improve the tightness of the checking device compared to a checking device provided with a single box, makes the reading of the tightness test difficult. In fact, the stacking of two boxes, therefore two cover-forming walls, hampers the visibility of the portion to be tested of the membrane. Furthermore, the intermediate chamber running between the two cover-forming walls where the observation is performed, can bring about the deposition of dirt or sludge, reducing the visibility in the tightness test.

Moreover, the bulk of the two superposed boxes as disclosed in this document KR101644126 hampers the reading by the operator in the zones close to corners, whether internal or external.

SUMMARY

One idea on which the invention is based is to enhance the tightness of the vacuum box in order to perform a tightness test on a sealing component, for example a membrane.

Another idea on which the invention is based is to allow a good visibility of the portion to be tested in the tightness test, with a low bulk on the periphery of the box allowing it to be put in place and implemented functionally in confined spaces.

Another idea on which the invention is based is to propose a tightness checking device which can be used rapidly, allowing the tightness of a sealed membrane of a tank to be tested in a minimum amount of time.

According to one embodiment, the invention provides a device for checking the tightness of a sealing component such as a single-layer membrane, for example a metallic membrane, or a multilayer membrane, for example a composite membrane, for a fluid storage tank, wherein the checking device comprises a box comprising:

a peripheral partition, a cover made of a transparent material, the cover being connected to the peripheral partition such that the cover and the peripheral partition are able to define, with a sealing component, an inner chamber, the peripheral partition comprising:

an inner peripheral wall having a bottom end equipped with an inner peripheral seal intended to be positioned against the sealing component all around the inner chamber; and an outer peripheral wall positioned outside the inner peripheral wall so as to define, between the outer peripheral wall and the inner peripheral wall, an intermediate chamber extending exclusively in the peripheral partition all around the inner chamber, the outer peripheral wall having a bottom end equipped with an outer peripheral seal intended to be positioned against the sealing component all around the inner peripheral seal;

a depressurizing device which is connected, for example directly or indirectly, to the inner chamber and to the intermediate chamber and is configured to depressurize said inner chamber and said intermediate chamber.

By virtue of these features, the vacuum box has a sufficient tightness to perform a tightness test on a membrane notably by virtue of the presence of two peripheral seals, inner and outer, separated from one another by an intermediate chamber that is also depressurized during the test. In fact, the inner seal and the outer seal contribute to enhancing the tightness of the vacuum box with respect to a traditional box having only a single seal. Furthermore, because of the depressurization in the intermediate chamber, there is no appearance of stray bubbles in the portion to be tested during the tightness test all around the inner seal forming the periphery of the inner chamber. Only stray bubbles can form at the outer seal, that is to say in the intermediate chamber, due to the pressure difference between the outside and the intermediate chamber.

Finally, the intermediate chamber does not extend in the transparent cover as in the patent KR101644126 which makes it possible not to degrade the visibility in the observation through the transparent cover of the tightness test. In fact, the intermediate chamber can be the source of dirt or sludge which could hamper the observation through the transparent cover. In some cases, when the present invention is considered with the use of surface active agents to identify any holes or orifices in the sealing component tested, bubbles appear in the intermediate chamber, initially at the surface of its lateral partitions, and are propagated to the transparent cover, which, without fail, will hamper the visibility of the operator.

According to embodiments, such a checking device can comprise one or more of the following features.

According to one embodiment, the sealing component comprises a sealing membrane.

According to one embodiment, the peripheral partition comprises a top portion connecting the outer peripheral wall and the inner peripheral wall to the cover and tightly covering the intermediate chamber.

Thus, the top portion makes it possible to limit the volume of the intermediate chamber in order to facilitate the depressurizing of the intermediate chamber. Furthermore, the loading caused by the different pressure differences are transferred mainly to one wall, which makes it possible to reduce the footprint over the periphery (rather than two walls in the case of a box within a box).

According to one embodiment, the ratio between a height of the inner peripheral wall and a height of the peripheral partition is between 5 and 70%, preferably between 15 and 50%.

The heightwise direction corresponds to the direction extending from the sealing membrane to the cover.

According to one embodiment, the ratio between a height of the outer peripheral wall and a height of the peripheral partition is between 5 and 70%, preferably between 15 and 50%.

According to one embodiment, the height of the inner peripheral wall is equal to the height of the outer peripheral wall.

According to one embodiment, the cover is made of glass or of polymethyl methacrylate (PMMA).

According to one embodiment, the checking device comprises an air evacuation pipe which is connected, on one side, to a depressurizing member of the depressurizing device and, on the other side, to the intermediate chamber so as to set the intermediate chamber to a pressure $P1$ lower than atmospheric pressure.

According to one embodiment, the inner peripheral wall comprises a communication channel fluidically connecting the inner chamber and the intermediate chamber.

According to one embodiment, the checking device comprises one or more pressure regulators, for example a valve, placed at the communication channel, said pressure regulator or regulators being configured so that, when the depressurizing device is started up, the inner chamber is set to a pressure $P2$ lower than atmospheric pressure and higher than the pressure $P1$.

Thus, the pressure regulator makes it possible to obtain a pressure differential between the inner chamber and the intermediate chamber. In fact, the pressure of the inner chamber is higher than the pressure of the intermediate chamber. Because of this, a gas cannot pass from the intermediate chamber to the inner chamber, for example by passing under the inner seal, and therefore risk making stray bubbles. Consequently, the pressure regulator makes it possible to improve the reliability of the tightness test with the checking device.

According to one embodiment, the depressurizing member is a first depressurizing member and the air evacuation pipe is a first air evacuation pipe, the checking device comprising a second air evacuation pipe which is connected, on one side, to a second depressurizing member of the depressurizing device and, on the other side, to the inner chamber so as to set the inner chamber to a pressure $P2$ lower than atmospheric pressure and higher than the pressure $P1$.

Thus, the first depressurizing member and the second depressurizing member make it possible to obtain a pressure differential between the inner chamber and the intermediate chamber. In the same way as for the pressure regulator, the first depressurizing member and the second depressurizing member therefore make it possible to improve the reliability of the tightness test with the checking device.

According to one embodiment, the depressurizing member, the first depressurizing member and/or the second depressurizing member comprises a pump or a system that uses the Venturi effect.

According to one embodiment, the difference between the pressure $P2$ and the pressure $P1$ is between 100 and 5000 Pa, preferably substantially equal to 1000 Pa. For example, the pressure $P1$ can be equal to −200 mbarg (approximately $8.325 \cdot 10^4$ Pa) and the pressure $P2$ can be equal to −190 mbarg (approximately $8.425 \cdot 10^4$ Pa).

According to one embodiment, the checking device comprises:
 a carrying handle fixed to the box;
 a control member that can be actuated manually to produce a control signal, the control member being positioned on or in immediate proximity to the carrying handle so as to be able to be actuated by a hand of a user holding the carrying handle, and wherein the depressurizing device comprises a controlled valve that can be switched over to an open state to connect the inner chamber and the intermediate chamber to the depressurizing member and a closed state to isolate the inner chamber and the intermediate chamber from the depressurizing member, the checking device comprising a control unit configured to switch over the controlled valve in response to the control signal.

By virtue of these features, the control member situated on or in proximity to the carrying handle allows reliable and easy use by a single user who can place the checking device using the carrying handle while actuating the evacuation without needing to release the carrying handle or require the presence of another user. Furthermore, such a device allows a more rapid use and thus makes it possible to test the tightness of a sealed membrane of a tank in a minimum amount of time.

According to one embodiment, the control unit is configured to switch over the controlled valve alternately between the open state and the closed state in response to the control signal.

According to one embodiment, the control member is a first control member that can be actuated manually to produce a first control signal and the checking device further comprises a second control member that can be actuated manually to produce a second control signal, the control unit being configured to switch over the controlled valve to the open state in response to the first control signal and to the closed state in response to the second control signal.

According to one embodiment, the carrying handle is a first carrying handle and the checking device further comprises a second carrying handle, the first carrying handle and the second carrying handle being positioned on the perimeter of the box opposite one another.

According to one embodiment, the peripheral seal or the inner peripheral seal and/or the outer peripheral seal has a seal end forming a loop all around the inner chamber and intended to be positioned against the sealing component, the seal end being situated in a plane, and the cover being formed parallel to said plane so as to form a tightness checking device for a flat zone.

Thus, the checking device is suitable for performing the checking of tightness in the flat zones of the tank.

According to one embodiment, the inner peripheral seal and/or the outer peripheral seal has a seal end forming a loop all around the inner chamber and intended to be positioned against the sealing component, a first part of the seal end being situated in a first plane and a second part of the seal end being situated in a second plane that is inclined with respect to the first plane, and the cover being formed by a plane that is inclined with respect to the first plane and to the second plane so as to form a tightness checking device (4) for a corner zone.

Thus, the checking device is suitable for performing the checking of tightness in the corner zones of the tank. In fact, the form of the peripheral seals makes it possible to follow the inclination of the tank walls in the corner zones and thus conserve an inner chamber and a sealed intermediate chamber.

Also, as explained hereinbelow, the dimensions of the box according to the invention are chosen so as to be able to perfectly adapt to the zones to be tested, without being too great. In fact, it should be noted here that, in particular in the corner zones, or angled zones, the test surface is very often irregular and the real angle is different from the theoretical design angle so that a box with excessively great dimensions would maintain the vacuum necessary to the tightness tests with great difficulty.

According to one embodiment, the first plane and the second plane are inclined with respect to one another by an angle of between 60 and 170 degrees, preferably by an angle equal to 90 degrees, 135 degrees or 108.4 degrees or even 161.6 degrees. It can be noted here that angles of inclination between two contiguous faces that are relatively commonplace in the field of the invention, and therefore for LNG or LPG tanks, are typically 90° and 135°.

In one embodiment, the checking device has a longitudinal dimension of between 290 and 432 mm, preferably equal to 320 mm or 430 mm, the longitudinal dimension being intended to be parallel to a tank edge during use. Thus, in a standard zone, that is to say, for example, the top and bottom flat zones of the tank, the conventional longitudinal dimension is 320 mm (millimeters) whereas, for the corner zones, between two faces of the tank, the longitudinal dimension is conventionally 430 mm.

Thus, the checking device has an optimal longitudinal dimension in order to perform a tightness check over an entire bandwidth of the sealing membrane while passing between two preassembled primary insulating blocks.

According to one embodiment, the checking device comprises at least one lighting device fixed to the peripheral partition, and configured to light the inner chamber.

Thus, the lighting device makes it possible to improve the quality of the tightness check performed visually by allowing any leaks to be identified more easily.

According to one embodiment, the checking device comprises a plurality of lighting devices placed around the inner chamber. For example, the lighting is provided using a strip of LEDs.

According to one embodiment, the checking device comprises a safety valve connected to the intermediate chamber and that can be switched over to a closed state when the pressure in the intermediate chamber is higher than or equal to a pressure Pmin and an open state when the pressure in the intermediate chamber is lower than the pressure Pmin to connect the intermediate chamber to the outside.

According to one embodiment, the value of Pmin lies between 200 and 1000 mbar, preferably equal to 800 mbar.

According to one embodiment, the invention also provides a checking method performed using a tightness checking device described above on a sealing component of a fluid storage tank, wherein the method comprises the following steps:

applying, for example by spraying, water including surface active agents, for example soapy water, on a portion to be tested of the sealing component, placing the tightness checking device on the portion to be tested such that the outer peripheral seal and the inner peripheral seal are in contact with the portion to be tested, depressurizing the inner chamber and the intermediate chamber, using the depressurizing device, observing, through the transparent cover, the appearance of bubbles on the portion to be tested.

Thus, in case of a leak in the portion to be tested, bubbles form at the leak by virtue of the depressurization in the inner chamber. In fact, the gas entering into the inner chamber to balance the pressures between the outside and the inner chamber is trapped by the surface active agents present in the water, which forms bubbles at the leak.

According to one embodiment, the invention also provides a checking method performed using a tightness checking device described above on a sealing component of a fluid storage tank, wherein the method comprises the following steps:

injecting a colored gas under a portion to be tested of the sealing component, placing the tightness checking device on the portion to be tested such that the outer peripheral seal and the inner peripheral seal are in contact with the portion to be tested, depressurizing the inner chamber and the intermediate chamber, using the depressurizing device, observing, through the transparent cover, the appearance of colored gas in the inner chamber.

The method according to the invention is broken down hereinbelow according to one embodiment, in this particular case by using a "colored gas", which is not illustrated hereinbelow and which is not directly linked with the technical problems of the prior art as explained previously, but, nevertheless, this embodiment is a very particularly suitable/appropriate alternative in the context of the present invention.

Note that the expression "colored gas" refers to a gas that is not toxic for a human operator and that exhibits the particular feature of being visible thereto. As a nonlimiting example, it is possible to consider, for example, smoke based (mostly) on carbon black or preferably water vapor containing glycols or glycerin.

According to one embodiment, during the depressurizing step, the intermediate chamber is set to a pressure P1 lower than atmospheric pressure.

According to one embodiment, during the depressurizing step, the inner chamber is set to a pressure P2 lower than atmospheric pressure and higher than the pressure P1, for example using the pressure regulator or the size of the communication channel.

According to one embodiment, the depressurizing step is performed by triggering the control member.

BRIEF DESCRIPTION OF THE DRAWINGS

Brief Description of the Figures

The invention will be better understood, and other aims, details, features and advantages thereof will become more clearly apparent from the following description of several particular embodiments of the invention, given purely in an illustrative and nonlimiting manner, with reference to the attached drawings.

Figure 1:
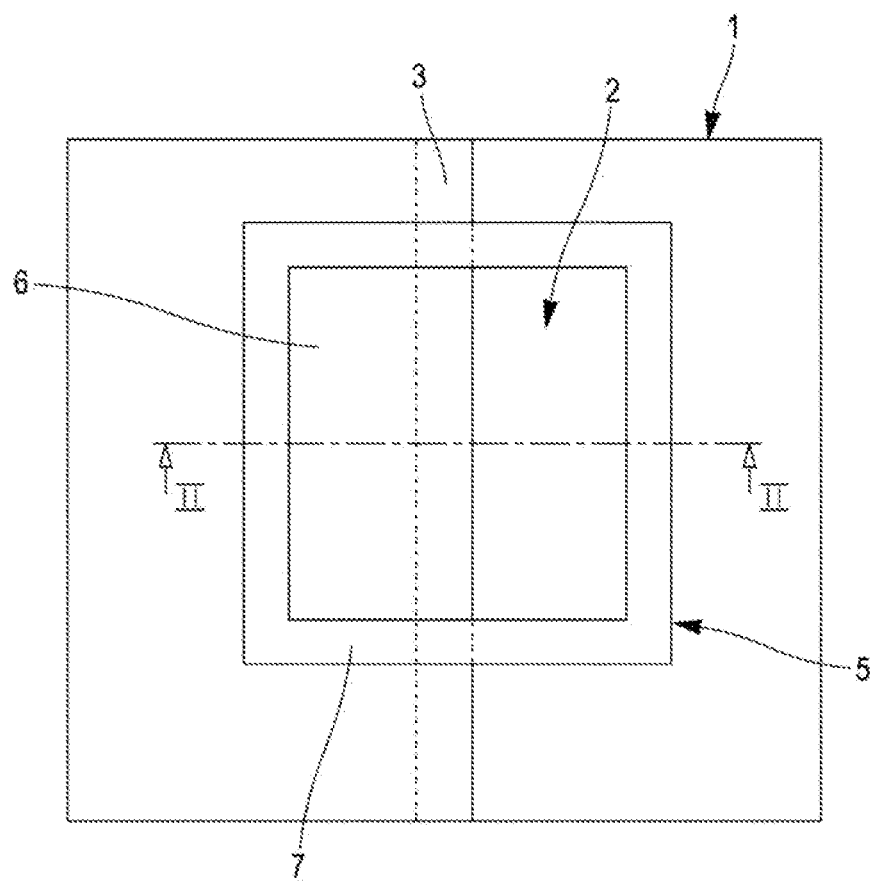

FIG. 1 represents a schematic top view of a tightness checking device according to the first embodiment, placed on a sealing membrane.

Figure 2:
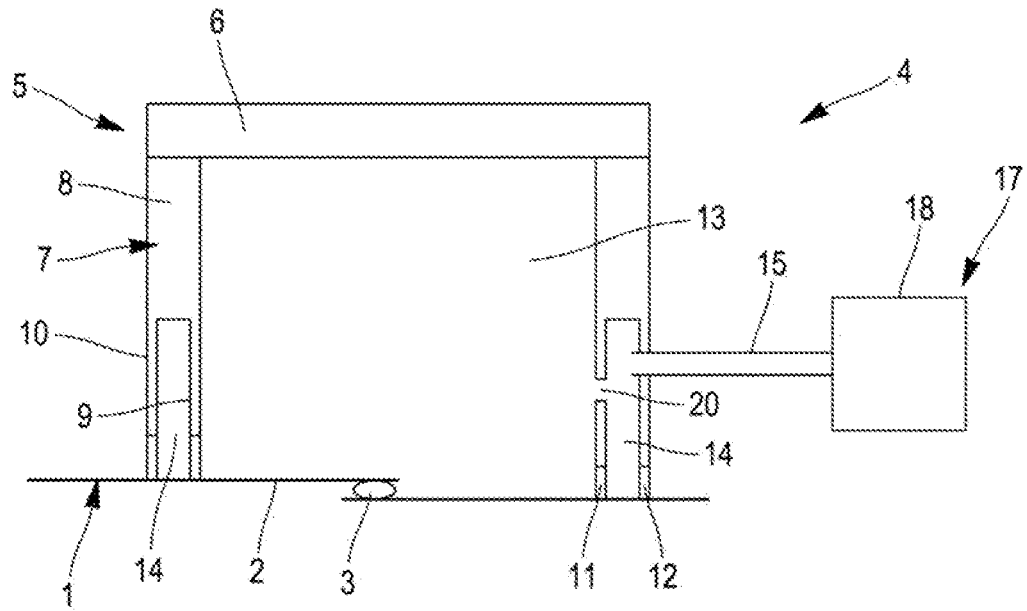

FIG. 2 represents a schematic view in cross section along the line Il-Il of FIG. 1 of the tightness checking device according to the first embodiment.

Figure 3:
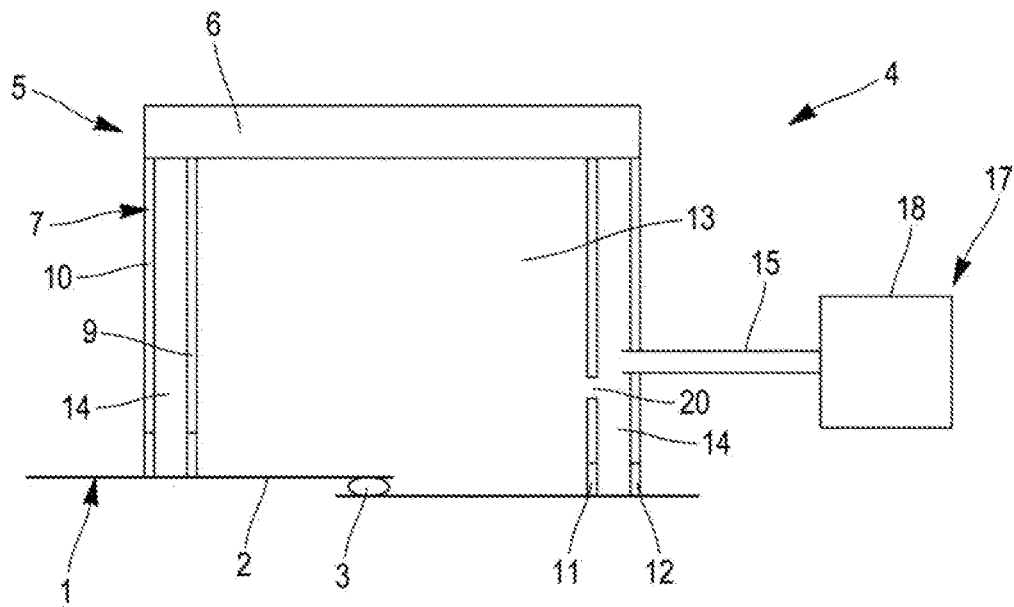

FIG. 3 represents a schematic view in cross section of a tightness checking device according to a second embodiment.

Figure 4:
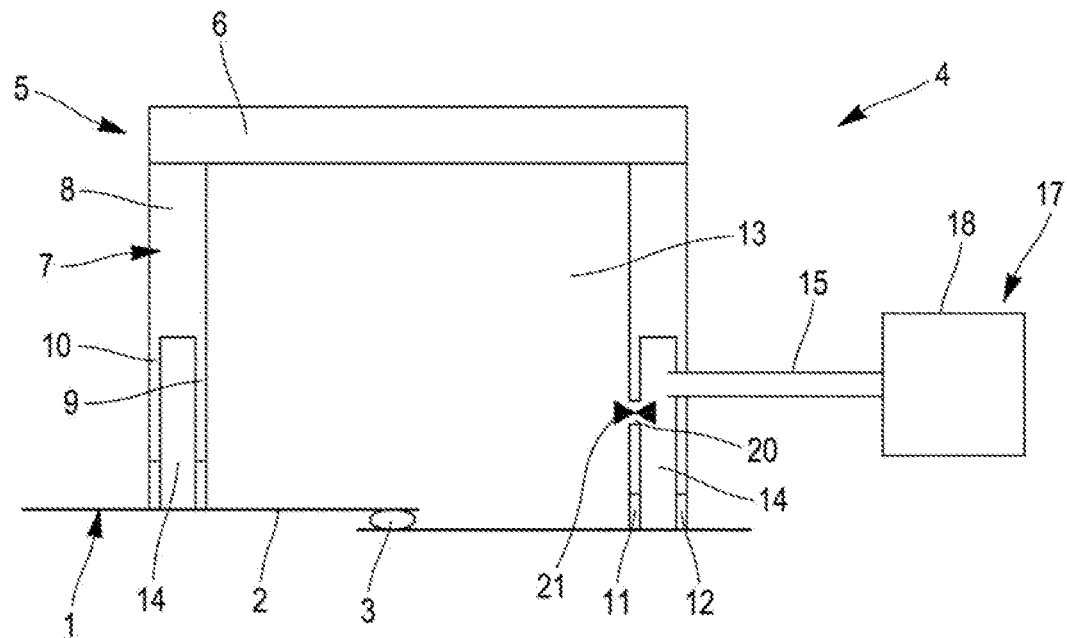

FIG. 4 represents a schematic view in cross section of a tightness checking device according to a third embodiment.

Figure 5:
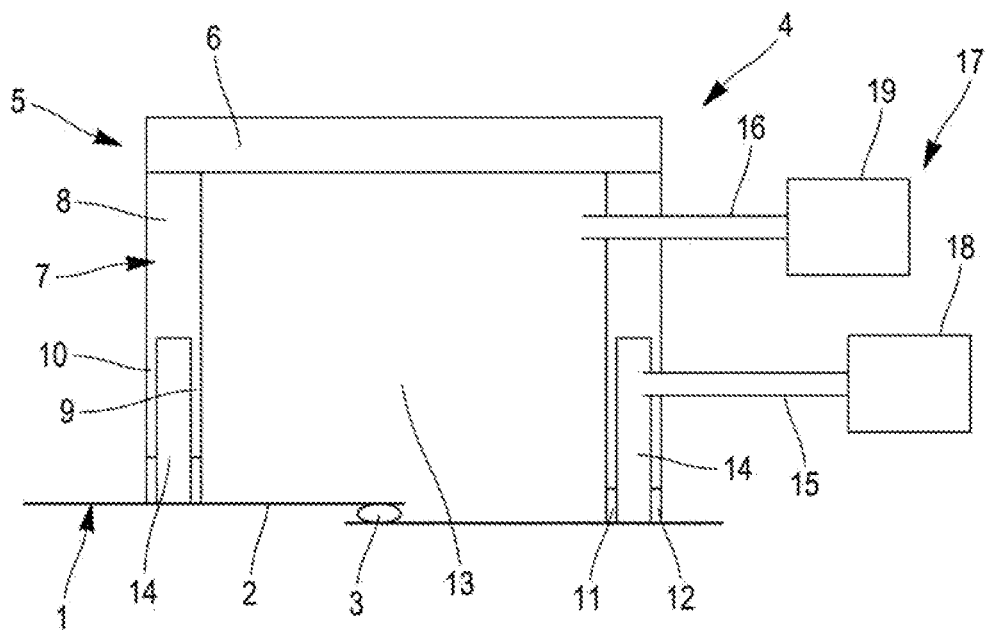

FIG. 5 represents a schematic view in cross section of a tightness checking device according to a fourth embodiment.

Figure 6:
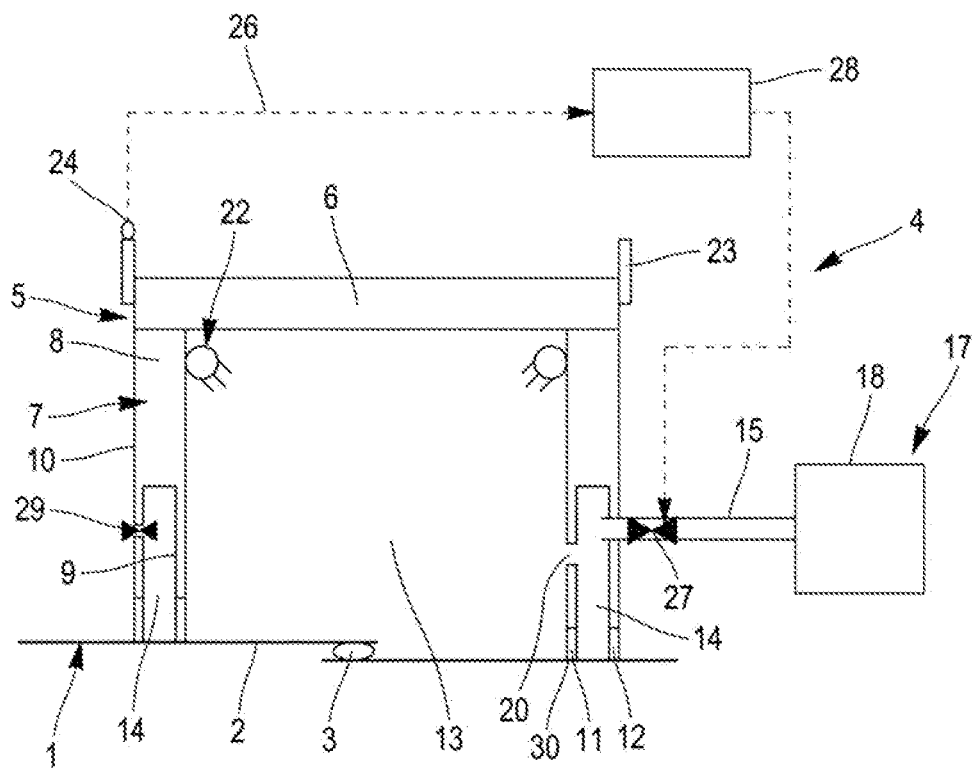

FIG. 6 represents a schematic view in cross section of a tightness checking device according to a fifth embodiment.

Figure 7:
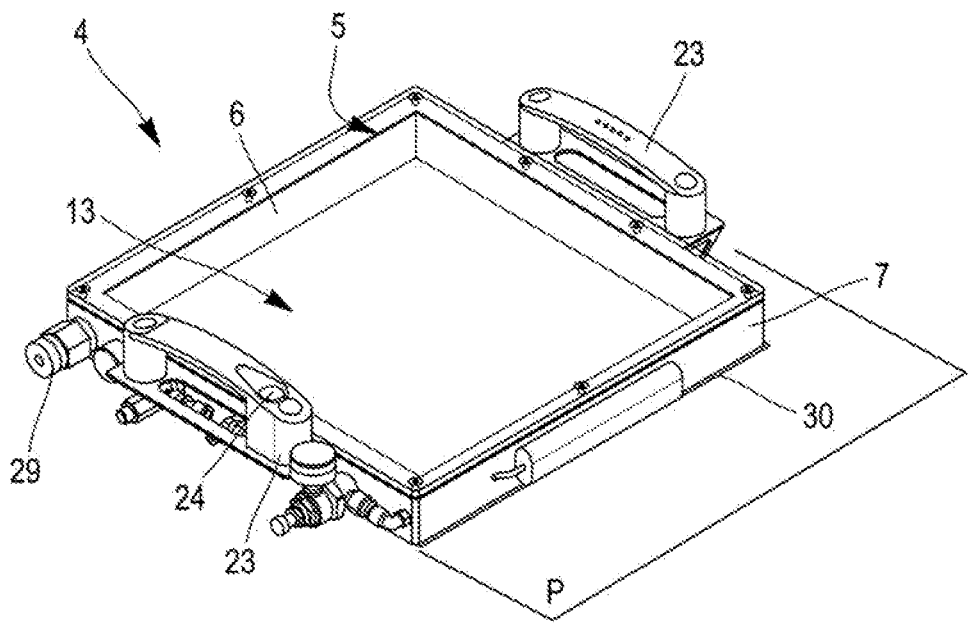

FIG. 7 represents a perspective view of a tightness checking device according to the fifth embodiment for a flat zone.

Figure 8:
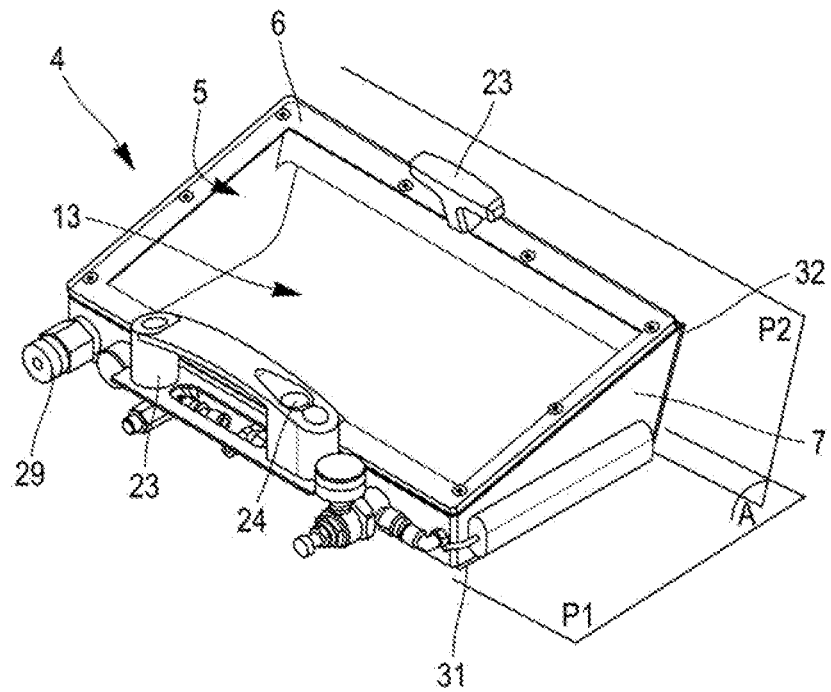

FIG. 8 represents a perspective view of a tightness checking device according to a sixth embodiment for a corner zone.

Figure 9:
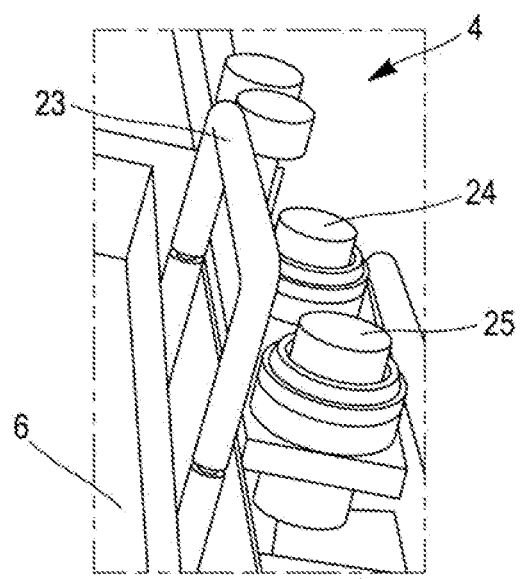

FIG. 9 represents a partial view of a tightness checking device according to a seventh embodiment in which one of the carrying handles is illustrated.

Figure 10:
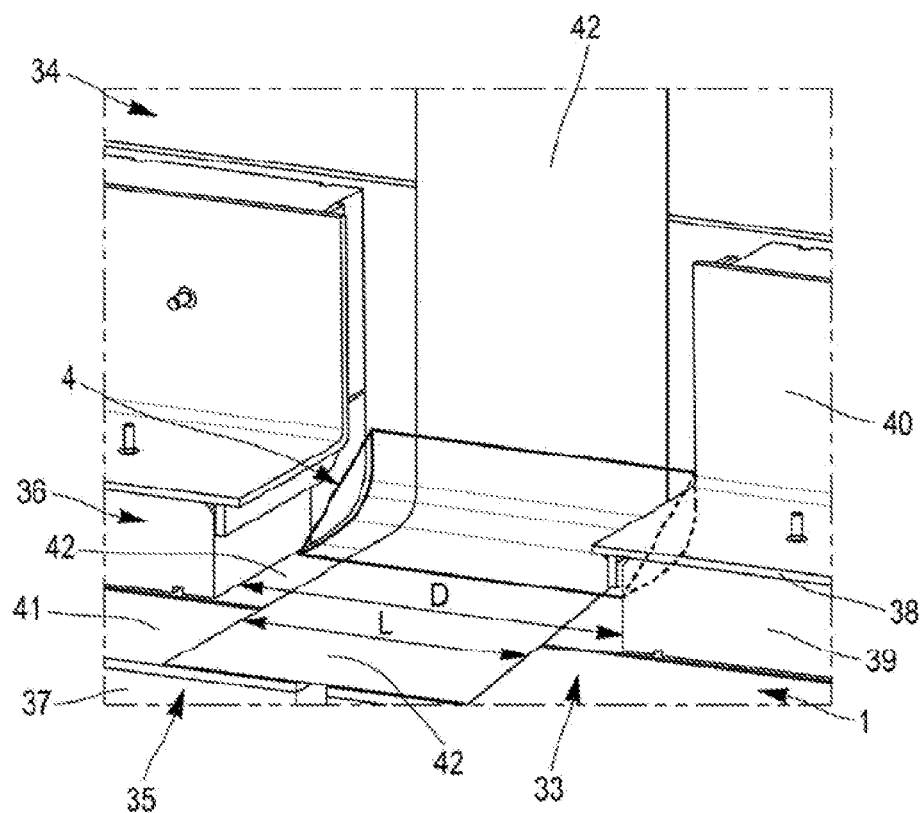

FIG. 10 represents a partial perspective view of a tank corner structure with the schematic placement of a tightness checking device according to the sixth embodiment.

DESCRIPTION OF THE EMBODIMENTS

Below a tightness checking device 4 will be described which can be used to detect leaks in a sealing component such as a sealing membrane 1 for a fluid storage tank.

In the example below, the fluid storage tank is a sealed and thermally insulating tank for storing and/or transporting liquified gas. The sealing membrane 1 is a sealing membrane made of a laminated composite material comprising an aluminum sheet between two layers of glass fiber and of resin. The sealing membrane 1 comprises a plurality of elements made of composite material which are glued to one another by overlaps so as to form an overlapping zone 3.

However, the invention can also be used in other types of tank and for other types of sealing membranes. For example, the sealing membrane could be a metal membrane comprising a plurality of elements welded to one another.

During the tightness test step used to check the tightness of the membrane 1, the tightness checking device 4 is placed on a portion to be tested 2 of the membrane 1. This portion to be tested 2 can be situated at the location of an overlap zone 3 as illustrated in FIGS. 1 to 5, notably in FIG. 1, or any other zone of the sealing membrane 1.

The tightness checking device 4 comprises a box 5 comprising a peripheral partition 7 and a cover 6 that is transparent in the visible range to allow the observation of the portion to be tested 2 through the cover 6 by a user. The cover 6 is connected to the peripheral partition 7 on each of its edges so as to form, with the peripheral partition 7, a sealed inner chamber 13.

FIGS. 1 and 2 represent a first embodiment of the tightness checking device 4. As represented in FIG. 1 where only the box 5 of the checking device 4 is illustrated with the membrane 1, the cover 6 is of rectangular form and the peripheral partition 7, also of rectangular form, is fixed on each of the four edges of the cover 6 so as to form a rectangular parallelepipedal box 5. However, in embodiments that are not represented, the box 5 can have any other form suited to the portion to be tested 2 of the membrane, for example an elongate form, a polygonal form or a cylindrical form, the peripheral partition 7 being adapted to the form of the cover 6.

FIG. 2 represents also the first embodiment of the checking device 4. In this embodiment, the peripheral partition 7 comprises a top portion 8, an inner peripheral wall 9 and an outer peripheral wall 10. The inner peripheral wall 9 has a bottom end equipped with an inner peripheral seal 11 intended to be positioned against the membrane 1 all around the inner chamber 13. The inner peripheral wall 9 also has a top end tightly connected to a bottom end of the top portion 8. The top portion 8 is tightly connected by a top end to the cover 6.

Thus, the assembly formed by the portion to be tested 2, the inner seal 11, the inner wall 9, the top portion 8 and the cover 6 forms all the walls of the inner chamber 13 allowing the latter to be substantially tight during a tightness test, excluding a possible leak of the portion to be tested 2 of the membrane 1 or excluding connection to a depressurizing device 17.

The peripheral partition 7 further comprises an outer peripheral wall 10 positioned outside of the inner peripheral wall 9 and spaced apart therefrom. The outer peripheral wall 10 has a bottom end equipped with an outer peripheral seal 12 intended to be positioned against the membrane 1 all around the inner peripheral seal 11. The outer peripheral wall 10 also has a top end tightly connected to the bottom end of the top portion 8.

Thus, the assembly formed by the membrane 1, the outer seal 12, the outer peripheral wall 10, the top portion 8, the inner peripheral wall 9, and the inner seal 11 forms all the walls of an intermediate chamber 14 allowing the latter to be sealed during a tightness test, excluding possible leak from the membrane 1, connection to a depressurizing device 17 or to the inner chamber 13.

In the first embodiment represented in FIG. 2, the inner chamber 13 is fluidically connected to the intermediate chamber 14 by at least one communication channel 20 produced in the inner peripheral wall 9.

The checking device 4 also comprises a depressurizing device 17 which comprises a first, and single in this embodiment, depressurizing member 18 connected to the intermediate chamber 14 by a first pipe 15. The first pipe 15 thus passes through the outer peripheral wall 10 in order to allow the depressurizing of the intermediate chamber 14 by the first depressurizing member 18. In this embodiment, the inner chamber 13 is also depressurized using the communication channel 20 between the inner chamber 13 and the intermediate chamber 14, and using the first depressurizing member 18.

Furthermore, in this embodiment, the dimension of the communication channel 20 with respect to the volume of the inner chamber 13 and to the volume of the intermediate chamber 14 is chosen so as to slow down the balancing of the pressures between the inner chamber 13 and the intermediate chamber 14 when the depressurizing device 17 is actuated. Thus, the dimension of the communication channel makes it possible to obtain a greater depressurization in the intermediate chamber 14 than in the inner chamber for a given duration during a tightness test so as to enhance the reliability of the test. Advantageously, the communication channel is dimensioned so as to generate a pressure loss greater than or equal to the leak flow rate. Thus, by way of example, this communication channel can have a diameter of between 0.1 and a few millimeters, depending on the size of the leaks that can be reasonably expected given the sealing components tested.

FIG. 3 represents a second embodiment of the checking device 4. This second embodiment differs from the first embodiment in that the peripheral partition 7 does not have a top portion 8. In fact, as can be seen in FIG. 3, in this embodiment, the peripheral partition 7 comprises an inner peripheral wall 9 having a bottom end equipped with an inner peripheral seal 11 and a top end which is, this time, directly fixed to the cover 6. Likewise, the peripheral partition 7 comprises an outer peripheral wall 10 positioned outside the inner peripheral wall 9 and spaced apart therefrom. The outer peripheral wall has a bottom end equipped with an outer peripheral seal 12 and a top end which is, this time, directly fixed to the cover 6.

In this embodiment, the inner chamber 13 is therefore delimited by the portion to be tested 2, the inner peripheral wall 9 and the cover 6. In addition, the intermediate chamber 14 is delimited by the membrane 1, the outer seal 12, the outer wall 10, the cover 6, the inner wall and the inner seal 11.

FIG. 4 represents a third embodiment of the checking device 4. This third embodiment is very similar to the first embodiment of FIG. 2. This embodiment differs from the first embodiment only in that a pressure regulator 21 is placed in the communication channel 20.

The pressure regulator 21 is, in this embodiment, a valve configured to ensure a pressure difference between the inner chamber 13 and the intermediate chamber 14. In fact, for example, if a pressure P2 is wanted in the inner chamber 13 which is higher than a pressure P1 in the intermediate chamber 14, the pressure regulator 21 can be configured to leave open the fluidic connection between the inner chamber 13 and the intermediate chamber 14 as long as the pressure of the inner chamber 13 has not reached the pressure P1, then close the fluidic connection as soon as the value P1 is reached. In fact, with the depressurizing member 18 being connected to the intermediate chamber 14, the latter can continue to depressurize the intermediate chamber 14 to a pressure lower than the pressure P1.

FIG. 5 represents a fourth embodiment of the checking device 4. This embodiment is very similar to the first embodiment. However, the fourth embodiment differs from the first embodiment in that the inner chamber 13 is not linked to the intermediate chamber by a communication channel 20. In fact, in this embodiment, the inner chamber 13 and the intermediate chamber 14 are independent of one another such that it is possible to connect each of them to the depressurizing device 17 independently.

As illustrated in FIG. 5, the depressurizing device 17 here comprises a first depressurizing member 18 and a second depressurizing member 19. As in the preceding embodiments, the first depressurizing member 18 is connected to the intermediate chamber 14 by a first pipe 15 passing through the outer wall 10. The second depressurizing member 19 is connected to the inner chamber 13 by a second pipe 16 passing through the top portion 8.

Thus, in this embodiment, it is possible to set the intermediate chamber 14 to a pressure P1 using the first depressurizing member 18 and to set the inner chamber 13 to a pressure P2 different from the pressure P1 using the second depressurizing member 18.

FIGS. 6 and 7 represent a fifth embodiment of the checking device 4. In this embodiment, the box 5 comprises two carrying handles 23 which are fixed to the peripheral partition 7 in proximity to the cover 6. The two carrying handles are positioned opposite one another to allow a user to seize the checking device 4 with his or her two hands and position the checking device on the portion to be tested 2 easily. For example in FIG. 3, the carrying handles 23 are fixed using a bracket onto the outer peripheral wall 10. The carrying handles 23 are turned away from the peripheral seals 11, 12.

In the embodiment illustrated in these FIGS. 6 and 7, one of the carrying handles 23 is equipped with a control member 24, here a pushbutton, that can be actuated by the hand of the user holding the handle 23 to produce a control signal 26. In this embodiment, the control member 24 is directly situated on the handle 23. This control signal 26 is transmitted to a control unit 28. The control unit 28 is configured to, in response to this control signal 26, switch over a controlled valve 27 situated at the depressurizing device in order to switch this valve 27 from an open state to a closed state and vice versa.

In the open state, the controlled valve 27 allows the fluidic connection of the inner chamber 13 and the intermediate chamber 14 with the depressurizing member 18. In the closed state, the controlled valve 27 isolates the inner chamber 13 and the intermediate chamber 14 from the depressurizing member 18.

Control members having a form other than a pushbutton can alternatively be envisaged, for example a capacitive touch button, a rocker lever, or any member that can be actuated manually.

In a seventh embodiment illustrated in FIG. 9, the checking device 4 comprises a first control member 24 that can be actuated manually to produce a first control signal 26 and the checking device 4 further comprises a second control member 25 that can be actuated manually to produce a second control signal 26. The control unit 28 is thus, here, configured to switch over the controlled valve 27 to the open state in response to the first control signal 26 coming from the first control member 24 and to the closed state in response to the second control signal 26 coming from the second control member 25. In addition, in this embodiment, the control members 24, 25 are not situated on the carrying handle 23 but in immediate proximity thereto so as to be able to be actuated by a hand of a user holding the carrying handle 23.

Returning to the fifth embodiment, the checking device 4 also comprises a plurality of lighting devices 22 that can be seen in FIG. 6 which are positioned on the inner peripheral wall 9 so as to light the inner chamber 13.

The checking device 4 also comprises a safety valve 29, illustrated in FIGS. 6 and 7, connected to the intermediate chamber 14 and that can be switched over to a closed state when the pressure in the intermediate chamber 14 is higher than or equal to a pressure Pmin and an open state when the pressure in the intermediate chamber 14 is lower than the pressure Pmin to connect the intermediate chamber 14 to the outside. Thus, the safety valve 29 prevents the formation of an excessive and unnecessary vacuum for the check in the intermediate chamber 14 and, all the more so, in the inner chamber 13, making it possible to avoid any damage to the checking device 4 or separation of the membrane 1.

The fifth embodiment illustrated in FIGS. 6 and 7 has a checking device 4 for a flat test zone. In fact, the inner and outer peripheral seals 11, 12 have a seal end 30 forming a loop around the inner chamber 13 and intended to be positioned against the portion to be tested 2, such that the seal end 30 is situated in a plane P. The cover is formed parallel to the plane P. Thus, the box 5 of the checking device has the form of a rectangular parallelepipedal with no bottom wall, the bottom wall being produced by the portion to be tested 2. Thus, the checking device 4 is suitable for performing the checking of tightness in the flat zones of the tank.

The sixth embodiment, illustrated in FIG. 8, has a checking device for a corner test zone.

In this embodiment, the inner peripheral seal 11 and the outer peripheral seal 12 have a seal end 30 forming a loop all around the inner chamber and intended to be positioned against the sealing component. This seal end 30 comprises a first part 31 situated in a first plane P1 and a second part 32 connected to the first part 31 and situated in a second plane P2 that is inclined with respect to the first plane P1 by an angle A corresponding to the angle of the tank to be followed. Furthermore, the cover 6 is, here, formed in a plane that is inclined with respect to the first plane P1 and to the second plane P2. Thus, the box 5 of the checking device 4 of this embodiment has the form of a prism that has for its base a quadrilateral, one of the angles of which corresponds to the angle of the tank, where two lateral walls are missing, the two lateral walls being formed by the portion to be tested 2 in corner form. Furthermore, in order to facilitate the positioning of the checking device 4 in the corner of the tank, one of the handles 23 is produced in the form of an inverted U while the other handle 23 is formed in the form of a T.

A sealed and thermally insulating tank comprises a plurality of walls 33, 34 each formed by at least one thermally insulating barrier and at least one sealing membrane. In a corner of a sealed and thermally insulating tank at the join between two walls 33, 34, a corner structure is placed in order to ensure the continuity of the thermally insulating barrier and of the sealing membrane of the two walls 33, 34. Such a corner structure is represented in FIG. 10. In the present invention, the tank walls 33, 34 comprise a secondary thermally insulating barrier 35, a secondary sealing membrane 1, corresponding to the membrane to be tested, supported by the secondary thermally insulating barrier 35, a primary thermally insulating barrier 36 fixed to the secondary sealing membrane 1 and a primary sealing membrane (not represented) supported by the primary thermally insulating barrier 36.

Thus, the corner structure comprises elements forming a part of the secondary thermally insulating barrier 35, elements forming a part of the secondary sealing membrane 1 and elements forming a part of the primary thermally insulating barrier 36. Consequently, the corner structure makes it possible to ensure the continuity of the different thermally insulating barriers and sealing membranes at the join between a first tank wall 33 and a second tank wall 34 that is inclined with respect to the first tank wall 33 by a determined angle, for example an angle of 90°.

The corner structure illustrated in FIG. 10 is thus composed:

of a row of secondary insulating panels 37 of the first wall 33 and of a row of secondary insulating panels 37 of a second wall 34 which are fixed to the supporting structure (not represented), rigid sealed sheets 41 glued onto the secondary insulating panels 37, flexible sealed sheets 42 making the connection between two adjacent rigid sealed sheets 41, whether that be on secondary insulating panels of one and the same wall or of different walls, as illustrated in FIG. 5, of a row of corner primary insulating panels 38 fixed to the rigid sealed sheets 41, the corner primary insulating panels 38 being composed of a primary insulating block 39 of the first tank wall 33 and of a primary insulating block 39 of the second tank wall 34 which are fixed to one another by an angle iron 40.

It is at the flexible sealed sheets 42 that the risk of leak is highest, notably at the fold formed to follow the inclination between the first tank wall 33 and the second tank wall 34. That is why it is advantageous for the checking device 4 to be able to be placed as close as possible to the angle of the corner structure. The checking device 4 has been illustrated schematically and in situ in FIG. 6.

At the gap between two adjacent secondary insulating panels 37 of one and the same tank wall, the two corner primary insulating blocks 38 are spaced apart from one another by a distance D in the direction of the tank edge formed by the intersection of the two tank walls 33, 34. The checking device 4 thus advantageously has a longitudinal dimension in the direction of the tank edge that is less than this distance D. In an exemplary embodiment, this distance D is equal to 322 mm.

Furthermore, the flexible sealed sheet 42 situated between two adjacent secondary insulating panels 37 of one and the same tank wall has a width L in the direction of the edge. In order to minimize the number of checks to be performed, it is advantageous for the checking device 4 to have a longitudinal dimension in the direction of the tank edge greater than this width L, as represented in FIG. 10.

Although the invention has been described in relation to a number of particular embodiments, it is quite obvious that it is in no way limited thereto and that it encompasses all the technical equivalents of the means described, and their combinations, provided that they fall within the framework of the invention.

The use of the verb "comprise" or "include" and its conjugate forms does not exclude the presence of elements or steps other than those stated in a claim.

In the claims, any reference symbol between parentheses should not be interpreted as a limitation on the claim.

The invention claimed is:

1. A device (4) for checking the tightness of a sealing component, such as a membrane (1) or a multilayer, for a fluid storage tank, wherein the checking device (4) comprises a box (5) comprising:
   a peripheral partition (7),
   a cover (6) made of a transparent material, the cover (6) being connected to the peripheral partition (7) such that the cover (6) and the peripheral partition (7) are able to define, with the sealing component (1), an inner chamber (13),
   the peripheral partition (7) comprising:
   an inner peripheral wall (9) having a bottom end equipped with an inner peripheral seal (11) intended to be positioned against the sealing component (1) all around the inner chamber (13); and
   an outer peripheral wall (10) positioned outside the inner peripheral wall (9) so as to define, between the outer peripheral wall (10) and the inner peripheral wall (9), an intermediate chamber (14) extending exclusively in the peripheral partition (7) all around the inner chamber (13), the outer peripheral wall having a bottom end equipped with an outer peripheral seal (12) intended to be positioned against the sealing component (1) all around the inner peripheral seal (11);
   a depressurizing device (17) which is connected to the inner chamber (13) and to the intermediate chamber (14) and is configured to depressurize said inner chamber (13) and said intermediate chamber (14),
   wherein the checking device (4) comprises an air evacuation pipe (15) which is connected, on one side, to a depressurizing member (18) of the depressurizing device (17) and, on the other side, to the intermediate chamber (14) so as to set the intermediate chamber (14) at a pressure P1 lower than atmospheric pressure,
   the inner peripheral wall (9) comprising a communication channel (20) fluidically connecting the inner chamber (13) and the intermediate chamber (14).

2. The checking device (4) as claimed in claim 1, wherein the peripheral partition (7) comprises a top portion (8) connecting the outer peripheral wall (10) and the inner peripheral wall (9) to the cover (6) and tightly covering the intermediate chamber (14).

3. The checking device (4) as claimed in claim 2, wherein the ratio between a height of the inner peripheral wall (9) and a height of the peripheral partition (7) is between 5 and 70%, preferably between 15% and 50%.

4. The checking device (4) as claimed claim 1, wherein the checking device (4) comprises a pressure regulator (21) placed at the communication channel (20), said pressure regulator (21) being configured so that, when the depressurizing device (17) is started up, the inner chamber (13) is set to a pressure P2 lower than atmospheric pressure and higher than the pressure P1.

5. The checking device (4) as claimed in claim 1, wherein the checking device (4) comprises:
   a carrying handle (23) fixed to the box (5);
   a control member (24) that can be manually actuated to produce a control signal (26), the control member (24) being positioned on or in immediate proximity to the carrying handle (23) so as to be able to be actuated by a hand of a user holding the carrying handle (23),
   and wherein the depressurizing device (17) comprises a controlled valve (27) that can be switched over to an open state to connect the inner chamber (13) and the intermediate chamber (14) to the depressurizing member (18) and a closed state to isolate the inner chamber (13) and the intermediate chamber (14) from the depressurizing member (18), the checking device (4) comprising a control unit (28) configured to switch over the controlled valve (27) in response to the control signal (26).

6. The checking device (4) as claimed in claim 5, wherein the control unit (28) is configured to switch over the control valve (27) alternately between the open state and the closed state in response to the control signal.

7. The checking device (4) as claimed in claim 5, wherein the control member is a first control member (24) that can be actuated manually to produce a first control signal and the checking device further comprises a second control member (25) that can be manually actuated to produce a second control signal, the control unit (28) being configured to switch over the controlled valve (27) to the open state in response to the first control signal and to the closed state in response to the second control signal.

8. The checking device (4) as claimed in claim 7, wherein the carrying handle is a first carrying handle (23) and the checking device (4) further comprises a second carrying handle (23), the first carrying handle and the second carrying handle (23) being positioned on the perimeter of the box (5) opposite one another.

9. The checking device (4) as claimed in claim 1, wherein the inner peripheral seal (11) and/or the outer peripheral seal (12) has a seal end (30) forming a loop all around the inner chamber (13) and intended to be positioned against the sealing component (1), the seal end (30) all around the inner chamber being situated in a plane, and the cover being formed parallel to said plane so as to form a tightness checking device (4) for a flat zone.

10. The checking device (4) as claimed in claim 1, wherein the inner peripheral seal (11) and/or the outer peripheral seal (12) has a seal end (30) forming a loop all around the inner chamber and intended to be positioned against the sealing component (1), a first part (31) of the seal end being situated in a first plane P1 and a second part (32) of the seal end being situated in a second plane P2 that is inclined with respect to the first plane, and the cover being formed in a plane that is inclined with respect to the first plane and to the second plane so as to form a tightness checking device (4) for a corner zone.

11. The checking device (4) as claimed in claim 10, wherein the checking device has a longitudinal dimension between 290 and 432 mm, preferably equal to 320 mm or 430 mm, the longitudinal dimension being intended to be parallel to a tank edge during use.

12. The checking device (4) as claimed in claim 1, wherein the checking device (4) comprises at least one lighting device (22) fixed to the peripheral partition (7) and configured to light the inner chamber (13).

13. The checking device (4) as claimed in claim 1, wherein the checking device (4) comprises a safety valve (29) connected to the intermediate chamber (14) and that can be switched over to a closed state when the pressure in the intermediate chamber (14) is higher than or equal to a pressure Pmin and an open state when the pressure in the intermediate chamber (14) is lower than the pressure Pmin to connect the intermediate chamber (14) to the outside.

14. A checking method performed using a tightness checking device (4) as claimed in claim 1 on a sealing component (1) of a fluid storage tank, wherein the method comprises the following steps:
   applying water containing surface active agents or injecting a colored gas, respectively on or under a portion to be tested (2) of the sealing component (1), placing the tightness checking device (4) on the portion to be tested (2) so that the outer peripheral seal (12) and the inner peripheral seal (11) are in contact with the portion to be tested (2), depressurizing the inner chamber (13) and the intermediate chamber (14) by means of the depressurizing device (17), observing, through the transparent cover (6), the appearance respectively of bubbles on the portion to be tested (2) or of colored gas in the inner chamber (13).

15. The checking method as claimed in claim 14, wherein, in the depressurizing step, the intermediate chamber (14) is set to a pressure P1 lower than atmospheric pressure.

16. The checking method as claimed in claim 15, wherein, in the depressurizing step, the inner chamber (13) is set to a pressure P2 lower than atmospheric pressure and higher than the pressure P1.

17. The checking method as claimed in claim 14 for a tightness checking device (4) as claimed in claim 5, wherein the depressurizing step is performed by triggering the control member (24).

\* \* \* \* \*